United States Patent
Li et al.

(10) Patent No.: US 9,892,153 B2
(45) Date of Patent: Feb. 13, 2018

(54) DETECTING LOST WRITES

(71) Applicant: ORACLE INTERNATIONAL CORPORATION, Redwood Shores, CA (US)

(72) Inventors: Yunrui Li, Fremont, CA (US); Mahesh Baburao Girkar, Cupertino, CA (US); Hongyi Yao, Jercy City, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 392 days.

(21) Appl. No.: 14/578,093

(22) Filed: Dec. 19, 2014

(65) Prior Publication Data

US 2016/0179867 A1  Jun. 23, 2016

(51) Int. Cl.
*G06F 7/00* (2006.01)
*G06F 17/30* (2006.01)
(Continued)

(52) U.S. Cl.
CPC .... *G06F 17/30368* (2013.01); *G06F 11/0751* (2013.01); *G06F 11/1435* (2013.01);
(Continued)

(58) Field of Classification Search
CPC ............. G06F 11/1471; G06F 11/2094; G06F 2211/1007
See application file for complete search history.

(56) References Cited

U.S. PATENT DOCUMENTS

| | | |
|---|---|---|
| 4,507,751 A | 3/1985 | Gawlick et al. |
| 4,710,926 A | 12/1987 | Brown et al. |

(Continued)

FOREIGN PATENT DOCUMENTS

| | | |
|---|---|---|
| EP | 0 503 417 A2 | 9/1992 |
| JP | 59-081940 | 5/1984 |

(Continued)

OTHER PUBLICATIONS

Alapati, S., Backing Up Databases. In: Expert Oracle Database 11g Administration, Apress, 2009, pp. 1-70.*

(Continued)

*Primary Examiner* — Cheyne D Ly
(74) *Attorney, Agent, or Firm* — Hickman Palmero Becker Bingham LLP (57) ABSTRACT

Techniques are described that determine occurrences of lost write by comparing version identifiers of corresponding replica data blocks and checkpoints of data files that include the data blocks. A method determines lost writes that may have occurred among a first set of data blocks and a second set of data blocks. Each data block in the first set of data blocks corresponds to a respective data block in the second set that is a version of data blocks in the first set. The data blocks in the first set and the second set are associated with version identifiers. The second set of data blocks is associated with a second checkpoint for which any version of a data block in the second set associated a version identifier below the second checkpoint has been acknowledged to a database server as having been written to persistent storage. The method proceed to determining the lost writes by determining that a data block in the first set and a data block in the second set satisfy criteria, such as the version identifier of the first data block is between the version identifier of the second data block and the second checkpoint.

20 Claims, 4 Drawing Sheets

(51) Int. Cl.
*G06F 11/14* (2006.01)
*G06F 11/07* (2006.01)
*G06F 11/20* (2006.01)

(52) U.S. Cl.
CPC ...... *G06F 11/1451* (2013.01); *G06F 11/1471* (2013.01); *G06F 17/30356* (2013.01); *G06F 17/30575* (2013.01); *G06F 11/2094* (2013.01); *G06F 2201/80* (2013.01); *G06F 2201/84* (2013.01)

(56) References Cited

U.S. PATENT DOCUMENTS

| | | | |
|---|---|---|---|
| 4,945,474 A | 7/1990 | Elliott et al. | |
| 5,146,571 A | 9/1992 | Logan | |
| 5,182,752 A | 1/1993 | DeRoo et al. | |
| 5,233,618 A | 8/1993 | Gilder et al. | |
| 5,327,556 A | 7/1994 | Mohan et al. | |
| 5,329,628 A | 7/1994 | Yamamoto et al. | |
| 5,418,940 A | 5/1995 | Mohan | |
| 5,581,754 A | 12/1996 | Terry et al. | |
| 5,588,012 A | 12/1996 | Oizumi | |
| 5,696,775 A | 12/1997 | Nemazie et al. | |
| 5,717,893 A | 2/1998 | Mattson | |
| 5,734,898 A | 3/1998 | He | |
| 5,805,799 A | 9/1998 | Fredrickson et al. | |
| 5,870,763 A | 2/1999 | Lomet | |
| 5,893,930 A | 4/1999 | Song | |
| 5,960,436 A | 9/1999 | Chang et al. | |
| 6,009,542 A | 12/1999 | Koller et al. | |
| 6,067,550 A | 5/2000 | Lomet | |
| 6,094,708 A | 7/2000 | Hilla et al. | |
| 6,098,190 A | 8/2000 | Rust et al. | |
| 6,151,607 A | 11/2000 | Lomet | |
| 6,272,500 B1 | 8/2001 | Sugita | |
| 6,298,425 B1 | 10/2001 | Whitaker et al. | |
| 6,324,661 B1 | 11/2001 | Gerbault et al. | |
| 6,438,724 B1 | 8/2002 | Cox et al. | |
| 6,446,234 B1 | 9/2002 | Cox et al. | |
| 6,449,623 B1 | 9/2002 | Bohannon et al. | |
| 6,535,869 B1 | 3/2003 | Housel, III | |
| 6,560,743 B2 | 5/2003 | Plants | |
| 6,728,879 B1 | 4/2004 | Atkinson | |
| 6,732,125 B1 | 5/2004 | Autrey et al. | |
| 7,149,858 B1 | 12/2006 | Kiselev | |
| 7,246,275 B2 | 7/2007 | Therrien et al. | |
| 7,257,689 B1 | 8/2007 | Baird | |
| 7,627,614 B2 | 12/2009 | Hu et al. | |
| 8,560,879 B1 * | 10/2013 | Goel | G06F 11/1088 714/6.1 |
| 2002/0049950 A1 | 4/2002 | Loaiza et al. | |
| 2002/0091718 A1 | 7/2002 | Bohannon et al. | |
| 2003/0061537 A1 | 3/2003 | Cha et al. | |
| 2003/0140288 A1 | 7/2003 | Loaiza et al. | |
| 2006/0200497 A1 | 9/2006 | Hu et al. | |
| 2006/0242513 A1 | 10/2006 | Loaiza et al. | |
| 2017/0116252 A1 | 4/2017 | Krishnaswamy | |

FOREIGN PATENT DOCUMENTS

| | | |
|---|---|---|
| JP | 02-189663 | 7/1990 |
| JP | 08-235032 | 9/1996 |
| JP | 10-040122 | 2/1998 |
| JP | 10-240575 | 9/1998 |

OTHER PUBLICATIONS

Written Opinion from PCT for foreign patent application No. PCT/US03/09063, dated May 24, 2004 (11 pgs.).
Japanese Patent Office, "Notice of Grounds of Rejection", Patent Application No. 558135-2002, dated Apr. 4, 2008, 2 pages.
India Patent Office, "Office Action", foreign application No. 1574/KOLNP/04, dated Sep. 2, 2008, 1 page.
IBM Corp., "IBM OS/2 Extended Edition Configuration," Feb. 1990, IBM Technical Disclosure Bulletin, vol. 32, No. 9B, pp. 446-451.
Current claims in PCT patent application, International Application No. PCT/US01/49760, 13 pages.
Current Claims in PCT patent application No. PCT/US03/09063 (10 pgs.).
Claims, Patent Application No. 558135-2002, 9 pages.
Claims, Foreign application No. PCT/US03/09063, 11 pages.
Claims, foreign application No. 2,482,891, 6 pages.
Claims, foreign application No. 1574/KOLNP/04, 12 pages.
Canadian Intellectual Property Office, Office Action, foreign application No. 2,482,891, dated May 16, 2008, 8 pages.
Antoni Cau, et al., "Specifying Fault Tolerance within Stark's Formalism," 1993, IEEE, pp. 392-401.

* cited by examiner

DETECTING LOST WRITES

FIELD OF THE INVENTION

The techniques and approaches described herein, relate to the field of electronic database management, particularly to detecting data loss.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

As part of its operation, database management system (DBMS) may frequently write information to storage locations. However, under certain circumstances, due to an error, the writes to a storage location may not persist causing data loss. Such occurrence is referred herein as "lost writes." Lost writes occur when a DBMS issues successful write commands but data fails to be persisted in storage. For example, in a multi-tier storage hierarchy, the upper tiers, such as a storage cache, may consist of volatile memory to increase the speed of storage operations. A database server may issue persistent disk write operation to an operating system, which in turn may pass the command to a storage controller. A storage controller may return a successful status for the operation but for optimization reasons may only write the data in its storage cache. Due to exigent circumstances such as power loss or faulty logic, the data from the cache may not be written into non-volatile storage disks. Thus, although the database server has received the successful status for the disk write operation, the data has not been changed on the disk, and the actual writes have been lost. Other optimizations to improve data write operation performance may similarly introduce a risk of lost writes. Since the DBMS has no knowledge of the lost write, DBMS may read and return the stale data from the disk.

The issue of lost writes may be further exacerbated when additional data changes are performed in a DBMS using the stale data that resulted from lost writes. As the DBMS receives numerous requests for data changes, some of these requests may use the existing data in the DBMS to generate the new data changes. For example, if the DBMS utilizes structured query language (SQL), a user may issue a single data manipulation language (DML) statement that retrieves data from the DBMS and then changes other data based on the retrieved data (ex. UPDATE or INSERT with SELECT subquery statements). The retrieved data may include the stale data that resulted from the lost writes, and thus, the other data would be changed using the stale data corrupting the other data. Therefore, the effects of lost writes may cascade in this fashion to other data in DBMS in a very short period of time. To avoid lost writes and its cascading effects, an efficient methodology is required to quickly identify any potential lost writes.

BRIEF DESCRIPTION OF THE DRAWINGS

In the drawings of certain embodiments in which like reference numerals refer to corresponding parts throughout the figures.

DETAILED DESCRIPTION

In the following description, for the purposes of explanation, numerous specific details are set forth in order to provide a thorough understanding of the present approach. It will be apparent, however, that the present approach may be practiced without these specific details. In other instances, structures and devices are shown in block diagram form in order to avoid unnecessarily obscuring the present approach.

General Overview

To avoid data loss and data corruption, a DBMS needs to provide an efficient way to detect early lost writes and to report the lost writes to the user. In an embodiment, the DBMS may use an existing backup of a primary database to compare data and detect lost writes. One such backup database may be a physical backup database that is updated based on redo logs of the primary database, referred to herein as a "standby database." Another backup database may be a logical backup database that is updated based on workload queries recorded in transaction logs of the primary database. The data from a backup database may then be compared to the corresponding data of the primary database to detect lost writes. Such comparison of data may be time consuming and burdensome on resources as each entry may be compared. In a related embodiment, a checksum of the data may be compared rather than the data itself.

A DBMS may store data in the database in named sets of data blocks. Each named set of data blocks is referred to herein as a "data file." Each data block within a data file may also contain its own version identifier corresponding to the last persistent writing of the data block. The data file may contain a data file header that stores the checkpoint of the data file indicating that all data blocks with versions below the checkpoint have been written persistently to the data file. In an embodiment, a standby database may contain data files corresponding to data files in the primary database. By comparing the checkpoints in data files and version identifiers of data blocks contained therein of the primary and standby databases, the DBMS may determine whether lost writes may have occurred either on the primary database or the standby database. In an embodiment, the DBMS may further compare the checksums of data blocks as well to verify the lost writes.

Standby Database

A standby database contains a backup, a static copy of a database. The phrase "backup" usually refers to the transfer of copied files from one location to another, in this case from one database, a primary database, to another database, a standby database. The backup may include all or important parts of a database such as the control file, redo logs, and data files and may be a snapshot of these parts at a certain time. The backup protects data from application error and acts as a safeguard against unexpected data loss, by providing a way to restore data to at least the data at that certain time when the backup was generated. In an embodiment, a standby database may be a real time backup of a primary (production) database. To keep the standby database "up-to-date" in real time, redo logs of the primary database are applied periodically to the standby database.

A standby database may also be used for detecting lost writes. "Lost writes" refer herein to writes issued to persistent storage device (e.g. disk drive) to write data persistently and which are acknowledged by the storage device as having been persistently written but which were not written persistently due to, for example, a storage device error or failure. Since the standby database is a physical replica of a primary database, the standby database may be compared with the production database to detect lost writes. The standby database may lag behind the production database, thus for accurate determination of lost writes, timestamp, checkpoint or version identifier of data in both databases may be compared.

Figure 1:
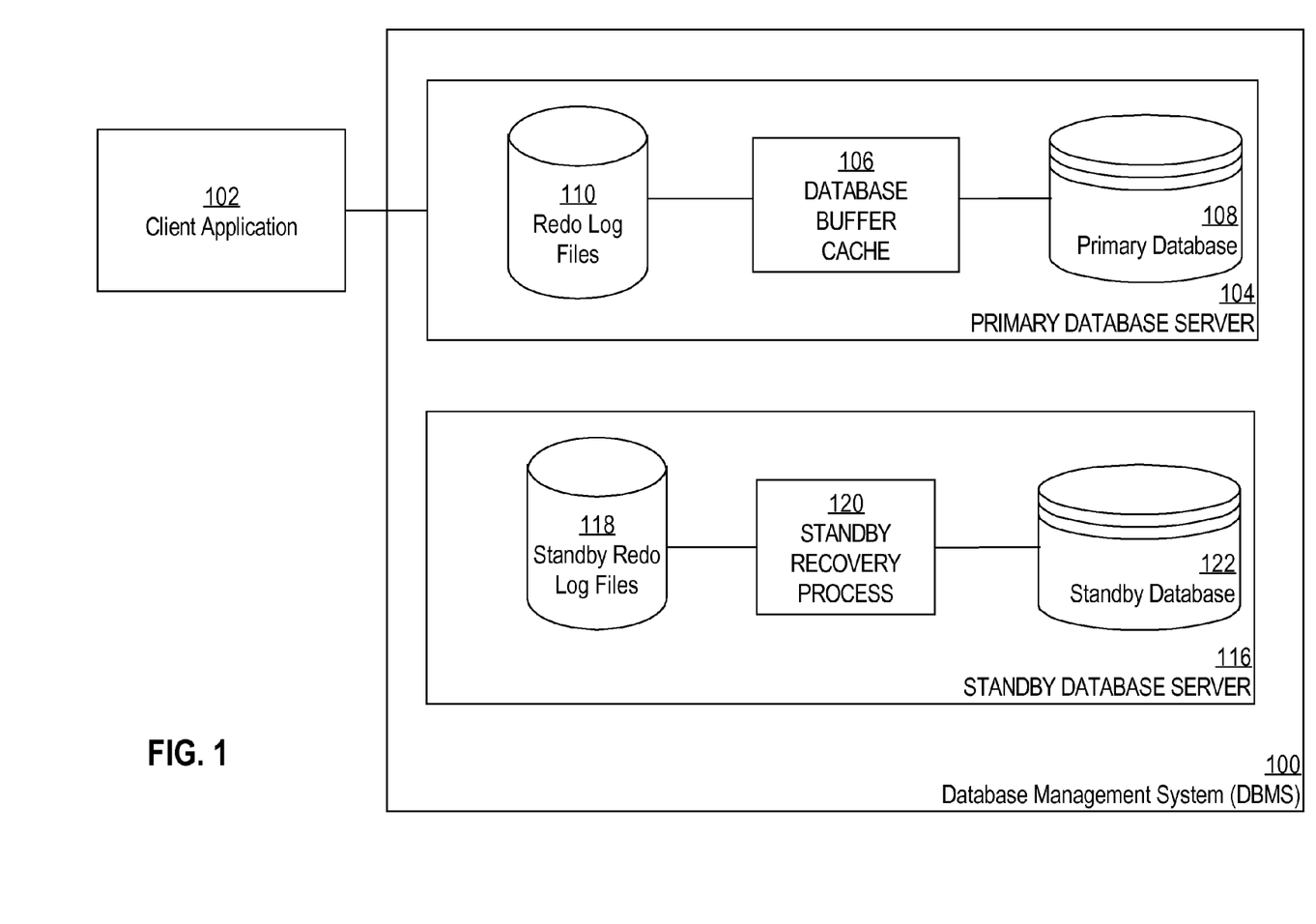
FIG. 1 is a system diagram that illustrates a DBMS replicating database changes in a primary database to a standby database, according to an embodiment.

FIG. 1 is a system diagram that illustrates database management system (DBMS) 100 in which changes made to data contained in a primary database are applied, in real-time, to a standby database, according to an embodiment. Database management system 100 comprises a database server 104, a database buffer cache 106, and a primary database 108, redo log files 110, a standby database server 116, standby redo log files 118, a standby recovery process 120, and a standby database 122. Standby database 122 may be located at a location that is remote relative to primary database 108 but connected through a network, such as a local area network (LAN), or a wide-area network (WAN) such as the Internet.

Client application 102 sends database commands to database server 104. Database server 104 receives the database commands from client application 102 and attempts to obtain, from database buffer cache 106, data that is required to execute the database commands. If the data is not contained in database buffer cache 106, then database server 104 obtains the data from primary database 108. Database server 104 stores the data obtained from primary database 108 in database buffer cache 106.

Database server 104 applies, to the buffered data in database buffer cache 106, changes indicated by the database commands. A "log writer" process of database server 104 also writes, to redo log files 110, redo records that indicate the changes to data blocks that database server 104 applied to the buffered data. At some point in time, a "database writer" process of database server 104 may store the modified buffered data contained in database buffer cache 106 to primary database 108.

According to an embodiment, log entries written to redo log files 110 are also transmitted, to standby database server 116. When database server 104 writes a redo record to redo log files 110, database server 104 may also transmit the redo record through network (not shown in FIG. 1) to standby database server 116. Standby database server 116 receives redo records and writes the redo records to standby redo log files 118, which are associated with standby database 122. Standby recovery process 120, which is also associated with standby database 122, reads the redo records from standby redo log files 118 to apply the records to standby database 122. Standby recovery process 120 applies the changes indicated in those redo records to the data in the data blocks that are also indicated by the records. Standby recovery process 120 may read the redo records and apply the changes indicated therein soon after the redo records have been written to standby redo log files 118. As a result, the data contained in standby database 122 is quickly synchronized with the data contained in primary database 108. At any given moment, the content of the data in standby database 122 may reflect the content of the data in primary database 108.

Using Data Version and Checkpoint Information to Detect Lost Writes

In an embodiment, a database server applies database changes based on client commands in a transactional manner. Database changes within a transaction are recorded in a redo log for data blocks of the database server. Thus, a data block may have a different state in the redo log than the last state of the same data block in a data file. Each state of a data block corresponds to a version of the data block. Accordingly, the version of the data block in the redo log may be different from the version of the same data block in the data file.

In an embodiment, a data block may include in a data header of the data block a version identifier of the data block. The version identifier may correspond to the version as of the last state of a data block.

In an embodiment, a version identifier is a monotonic increasing number. The version identifier for a subsequent state is greater than that of the version of the data block at the previous state. A version identifier represents a logical time of a database, that is, represents a particular state of a database that existed when a transaction was committed. An example a version identifier is a system change number (SCN). A redo record associated with the last transition to the state also contains the same SCN as in the data block header that the redo record describes. Thus, data blocks and the respective redo commit records are associated with the counter value or SCN. In other examples, a version identifier may be based on an actual timestamp of an operation that caused a new version.

In an embodiment, data blocks belong to a data file. Data files, similar to data blocks, may be versioned. By versioned, it is meant that the data file or data block is marked or otherwise associated with a version identifier representing a version of the data file or data block.

A data file may be versioned by a procedure referred to herein as checkpointing. A database server performs checkpointing on a data file by ensuring each the version of a data block in the data file that is below a version identifier value has been written persistently to the data file. The database server may then denote the data file with that version identifier value, which is referred to herein as the data file checkpoint or checkpoint of the data file.

The version identifier in a persistently stored data block in a data file may be lower or higher than the checkpoint of the data file. If lower, then the version identifier should represent the latest version of the data block as of the data file's checkpoint because checkpointing should ensure that any data block of a data file with a version identifier lower than a checkpoint has been persistently written.

Except under circumstances explained below, for a given data block in a data file, there should be no version identifier in a copy of the data block such that the version identifier in the copy is between the version identifier in the data block and the checkpoint of the data block's data file. A version identifier in a copy of the data block that exists between the version identifier in the data block and the checkpoint of the data block's data file is referred to herein as a divergent version identifier. If through procedures described below, a divergent version identifier is detected for a data block, then the latest version of the data block may not have been checkpointed or otherwise written persistently due to lost writes.

An approach for determining whether a version identifier existed for a data block is to compare version identifiers of data blocks between a standby database system and a primary database system. Since the standby database is replicated on a data block by data block basis using the redo logs of the primary database, version identifiers of the primary database data blocks are in effect replicated in the standby database. For a redo log record being applied to a standby database server, the redo record contains a version identifier for the change to the data block; the change as well as the version identifier is applied to the copy of the data block at the standby database server. If a version identifier in a data block in a primary database is a divergent version identifier at a standby database, or vice versa, then lost writes may have occurred.

Non-Logged Data Changes

Not all kinds of version identifiers generated at a primary database are replicated to a standby database. Thus, a version identifier in a primary database that is a divergent identifier at a standby database may not be a sign of lost writes, but may instead be a kind of version identifier that is not replicated at the standby database For example, changes made to metadata of the data block may not be recorded in the redo log of the database and may not be replicated at the standby database. Each data block may consist of user data and data block metadata. "User data," as referenced herein, corresponds to the data of one or more records organized in one or more fields in a database table. Any change to user data is recorded in the redo logs. On the other hand, metadata of a data block is data that is used to describe the data block properties to various database server processes that access the data block. Metadata may be stored in a header of the data block, in certain embodiments. Unlike changes to user data, changes to data block metadata may not be recorded in a redo log. However, in an embodiment, changes to metadata of a data block generate a new version of the data block and thus, a new version identifier associated with the data block. In such cases, the version identifier of a data block may not always represent that data changes to user data of the data block have been persisted. For example, after a transaction commits, the database server may generate a non-logged cleanup change to the metadata portion of the block indicating that the transaction has committed.

In an embodiment, such as one involving a cleanup operation on a data block, a redo log may contain a different version identifier for the data block than the header of the data block itself. Before the cleanup operation, the data block header may contain the version corresponding to a change of user data of the data block that was performed as part of a transaction. The initial operation of changing the user data of the data block is recorded in the redo log of the database server along with the corresponding version identifier of the change. However, the cleanup operation itself may not be recorded in the redo log because the operation is modifying only the metadata of the data block rather than the user data. Although the cleanup operation is not recorded in the redo log, the data block's version may still be updated for the cleanup operation. Therefore, the data block may contain the new version in the data block header that corresponds to the cleanup operation, while the redo log contains the previous version of the data block that corresponds to the transaction.

In an embodiment, a data block may represent that the last operation to modify the data block has only modified data block's metadata. The data header of the data block may contain a flag that may be set when only the data block metadata has changed. The non-logged cleanup operation may set the flag in the data block header to identify that only the data block's metadata was changed by the operation. Thus, the new version of the data block can be identified to be associated with a non-logged change of the metadata of the data block.

Detecting Lost Writes in Data Block

Figure 2:
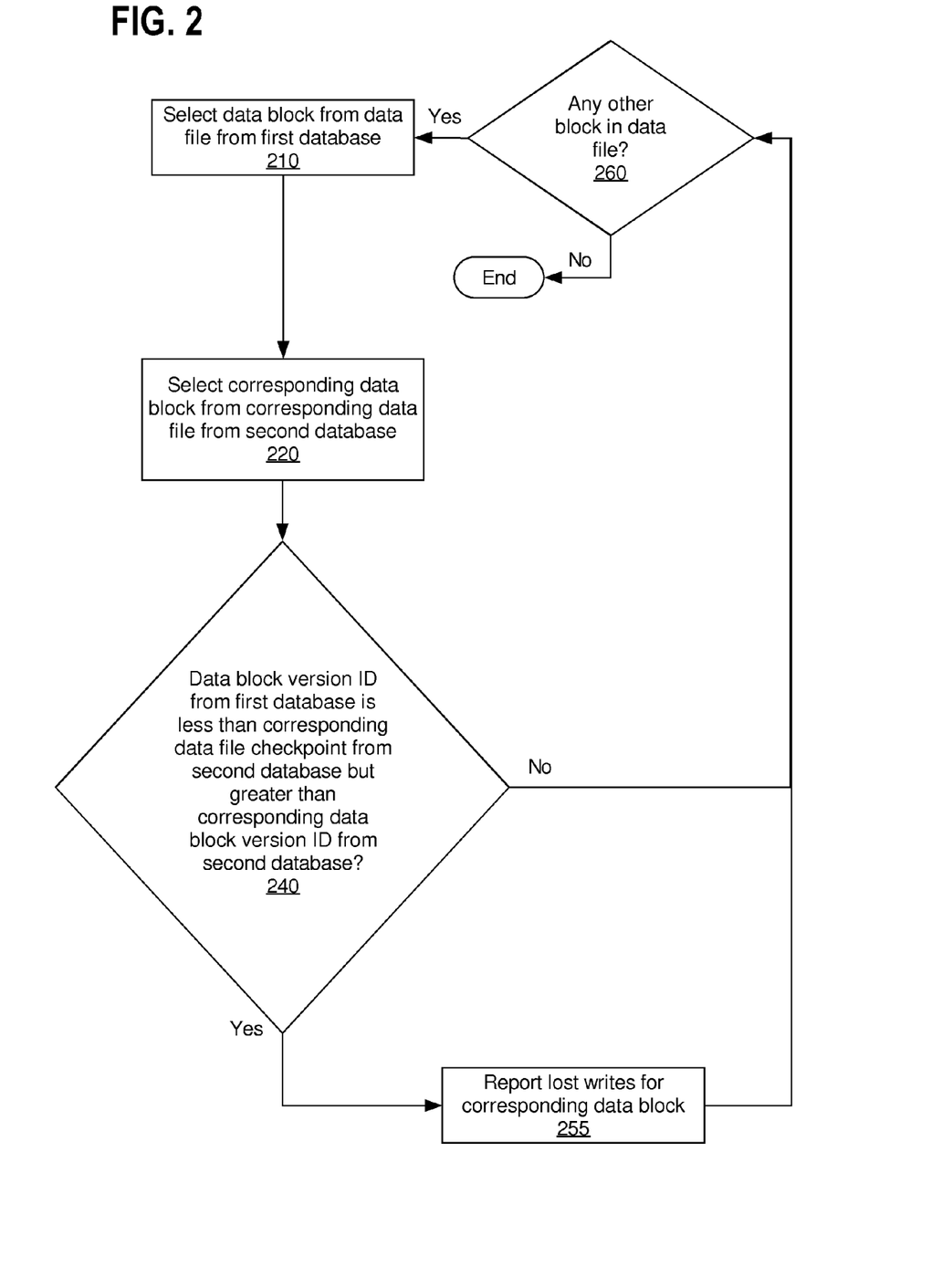
FIG. 2 is a flow diagram that depicts a process for detecting lost writes in data blocks of a data file, in an embodiment.

FIG. 2 is a flow diagram that depicts a process for detecting lost writes in data blocks of a data file, in an embodiment. The data blocks of the data file from a first database are compared to corresponding data blocks of a corresponding data file in a second database. The data blocks and data files from the first database are referred herein as the "first" data blocks and data files, and the corresponding data blocks and data files from the second database are referred herein as the "second" data blocks and data files. The first and second databases are physical replicas of one another. For example, the first database may be a standby database of the second database or the second database may be a standby database of the first database. However, the techniques described herein are independent of whether the first or the second databases are a backup, or whether the first or the second databases are a primary or standby databases. The techniques described herein may be used to detect potential lost writes in both a primary database and a standby database based on the respective replica databases.

At block 210, a first data block is selected from a first data file of the first database, and at block 220, the corresponding second replica data block is selected from the second replica data file in the second database. At block 240, version identifiers are retrieved from the headers of the first data block and the second data block and a checkpoint is retrieved from the header of the second data file for a comparison.

Based on the comparison, the second data block version identifier may be higher than the version identifier of the first data block from the first database. Thus, the second data block in the second database has been updated after the first data block in the first database (possibly, because the first and the second databases are out of sync). For example, if the second database is a primary database and has generated a change to the second data block that has not yet been replicated to the first database, then the first data block version identifier in the first database may be lower than the second data block version identifier in the second database because the change has not yet been applied in the first database (perhaps due to lag in replication of redo logs). Thus, the process may not make any determination about lost writes occurrence in the first data block and may transition to evaluate the next data block in the first database at block 260.

If, based on the comparison at block 240, the first data block version identifier matches the second data block's version identifier, then most likely the first database and the second database are in sync with respect to the first data block and second data block. Since it is highly unlikely that both the first and the second database have had lost writes for the same data block, the process evaluates the next data block in the first database at block 260.

Alternatively, if, at block 240, the first data block version identifier is evaluated to be greater than the second data block version identifier, then the version identifier of the first data block may also be compared with the checkpoint of the second data file. If the version identifier of the first data block is evaluated to be greater than or equal to the second data file checkpoint, this may denote that the changes to the first data block in the first database have not yet been checkpointed in the second database's second data file. Thus, the process may not be able to determine whether lost writes have occurred.

However, if, based on the comparison at block 240, the first data block version identifier is less than the second data file checkpoint but is greater than the second data block version identifier, then the second data block has a divergent version identifier, and the process may report lost writes at block 255. The lost writes at block 255 are detected because all the data blocks in the second data file have been checkpointed, and yet, the first data block has higher version identifier than the second data block as of the second data file's checkpoint. If not for the lost writes, the second data block should have been updated at the version identifier indicated by the first data block version identifier.

Stated differently, the second data block's data should have been completely up-to-date by the time, the second data block was checkpointed in the second data file. Thus, if, in the first database, the first data block version identifier is in between the second data file checkpoint and the second data block version identifier, then the second data block has a divergent version identifier. Accordingly, the second database has lost writes that would have triggered the second data block to be updated to the first data block's version identifier.

To illustrate detecting a possibility of lost writes in a corresponding second data block, the following example is provided. In this example, a first data block in the first database receives writes that versions the first data block to version identifier 10 corresponding to the SCN of the DBMS at the time of the writes. These writes are replicated to the second database through a redo log, where the second data block is respectively updated to version identifier 10 in the second data file. Then, when the SCN is at 20, the first data block receives other writes, and the first data block version identifier updates to 20. At some point thereafter when the SCN is at 30, the DBMS checkpoints the second data file and determines that that all the outstanding updates have been applied to the data blocks in the second data file including to the second data block. The second data file checkpoint is then updated to 30. To detect divergent version identifiers and possible missed writes, corresponding data blocks and data files in the first and second databases are compared. When comparing, if the second data block is still at version identifier 10 with all the updates committed as of the second data file checkpoint 30, then the first data block has a divergent version identifier, and the second data block may have missed the writes that updated the first data block version identifier to 20.

In an embodiment, a data block may have a divergent version identifier due to a non-logged change. As described above, a non-logged change may cause an update in a version identifier of a data block. Since a non-logged change updates metadata of the data block and not the user data, neither the updated version identifier nor the updated metadata may be replicated to a standby database. Accordingly, the corresponding data block in the standby database may reflect an "older" version identifier. Furthermore, if the data file in the standby database reflects a checkpoint after the non-logged change, then the non-logged version identifier would have a value in between the checkpoint and the version identifier of the corresponding data block. Thus, the non-logged updated data block would have a divergent version identifier.

Figure 3:
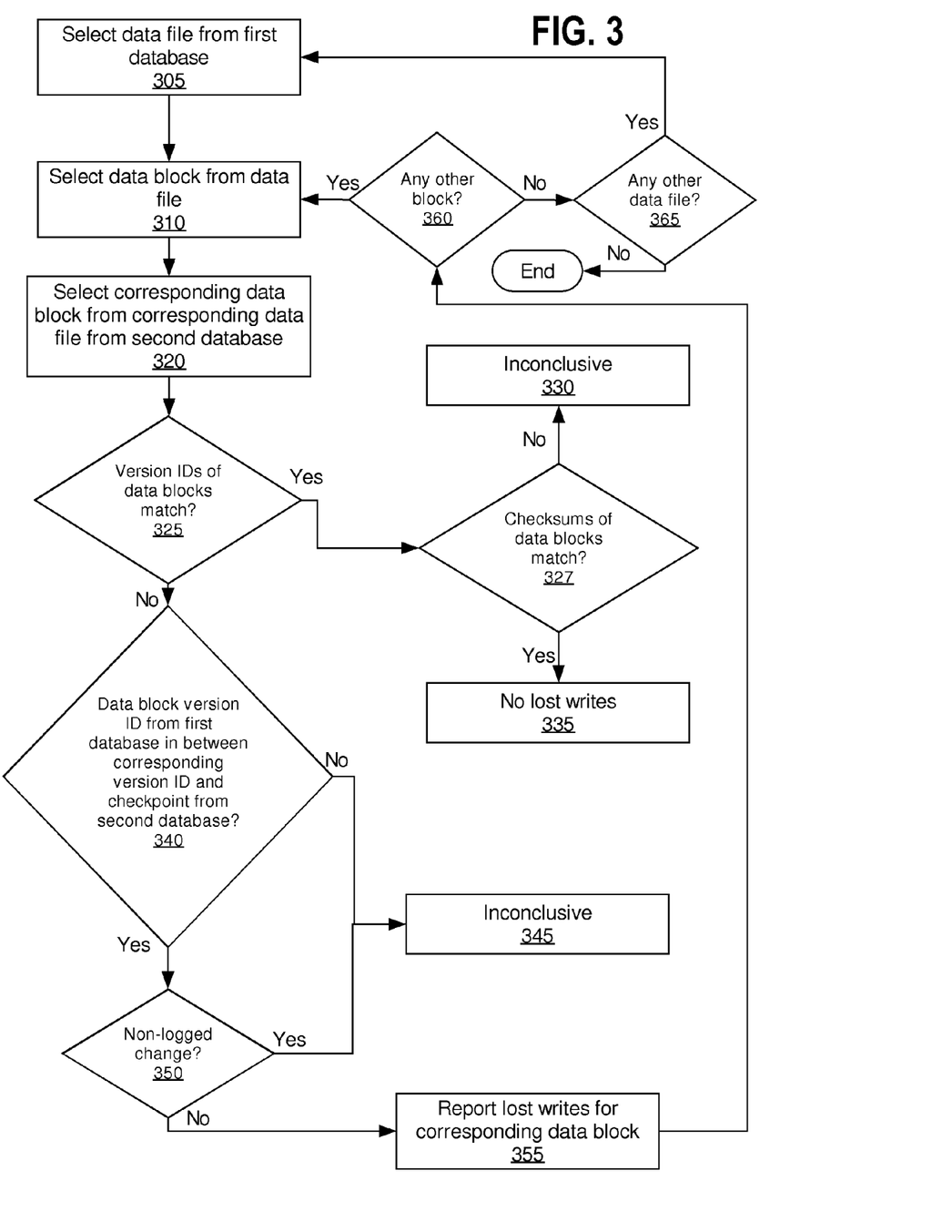
FIG. 3 is a flow diagram that depicts a process for detecting lost writes based on additional factors.

In a related embodiment, FIG. 3 is a flow diagram that depicts a process for detecting lost writes taking into account non-logged changes. Furthermore, if no lost writes are detected, the process may also affirmatively determine and report that writes to a data block have been successful. To do so, the process either compares raw data in the data block and its copy data block, or computes and compares the checksums of the data in the data blocks. A checksum, as referred herein, is a numerical value computed from the bits in data of a data block such that checksums for the same data yield equal values and checksums for non-matching user data yield different values.

To detect lost writes and successful writes, at block 305, the process selects a first data file from a first database that contains one or more data blocks. At block 310, a first data block from the first data file is selected and a corresponding second data block and second data file are selected from the second database at block 320. If the version identifiers of the first data block and the second data block match at block 325, then the process proceeds to block 327 to evaluate the checksums of the first data block and the second data block. If at block 327, the checksums of the data blocks match as well, then at block 335, the process may report that writes for both the first data block and the second data block have been successful, and no lost writes exist for the data blocks. Otherwise, if, at block 327, the checksums of the data blocks do not match, then at block 330, the process may report an inconclusive result. In a related embodiment, if the data block checksums do not match, the user data checksum may be calculated for the first and second data block and may be compared with each other. If the user data checksums match, then the process may report that writes have been successful, and no lost writes exist for the data blocks. However, if the user data block checksums do not match, then the process may report suspicious content for the data blocks.

On the other hand, if the version identifiers of the first data block and the second data block do not match at block 325, then, at block 340, the version identifier of the first data block is compared to the version identifier of the second data block and the checkpoint of the second data file. Similar to description of processing block 240, if the version identifier of first data block is greater than or equal to the second data file checkpoint, the process, at block 345, reports that no evidence of lost writes exists. Similarly, if the first data block version identifier is less than the second data block version identifier, then the process also reports an inconclusive result. However if, at block 340, the process evaluates the first data block version identifier to be greater than the second data block version identifier but less than the second data file checkpoint, then the second data block has a divergent version identifier, and the process proceeds to block 350.

At block 350, the process determines whether the first data block version identifier is due to a non-logged change. As described in the "Non-logged data changes" section above, a data block may be versioned when a non-logged data change has occurred. If, at block 350, the process evaluates that the first data block has been last versioned due to a non-logged data change, then the process proceeds to block 345 and reports that no evidence of lost writes exists.

However, if no non-logged data change has occurred, then the process proceeds to block 355 and reports that lost writes have been detected for the second data block.

At block 360, the blocks 310 through 355 may be processed for all the data blocks in the first data file. At block 365, the blocks 305 through 360 may be repeated for all the data files in the first database.

In an alternative embodiment, lost writes may be detected by scanning a redo log of a database. For each data block in a data file that has a lower version identifier than the checkpoint of the data file, the database redo log may be scanned for the copy of the data block. If a copy of the data block is found in the redo log, and the copy data block has a version identifier that is in between the data block's version identifier and the data file's checkpoint, then the redo log's copy of the data block is a divergent data block. The DBMS may then report lost writes for the data block in the data file.

Database Management Systems

A database management system (DBMS), such as DBMS 100 described herein, manages a database. A DBMS may comprise one or more database servers such as primary database server 104 and standby database server 116 that are described in FIG. 1. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

As used herein, "query" refers to a database command and may be in the form of a database statement that conforms to a database language. In one embodiment, a database language for expressing the query is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database. Although the embodiments of the approach are described herein using the term "SQL", the approach is not limited to just this particular database query language, and may be used in conjunction with other database query languages and constructs.

A client may issues a series of requests, such as requests for execution of queries, to a database server by establishing a database session, referred herein as "session." A session comprises a particular connection established for a client to a database server, such as a database instance, through which the client may issues the series of requests. The database server may maintain session state data about the session. The session state data reflects the current state of the session and may contain the identity of the user for which the session is established, services used by the user, instances of object types, language and character set data, statistics about resource usage for the session, temporary variable values generated by processes executing software within the session, and storage for cursors and variables and other information. The session state data may also contain execution plan parameters configured for the session.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
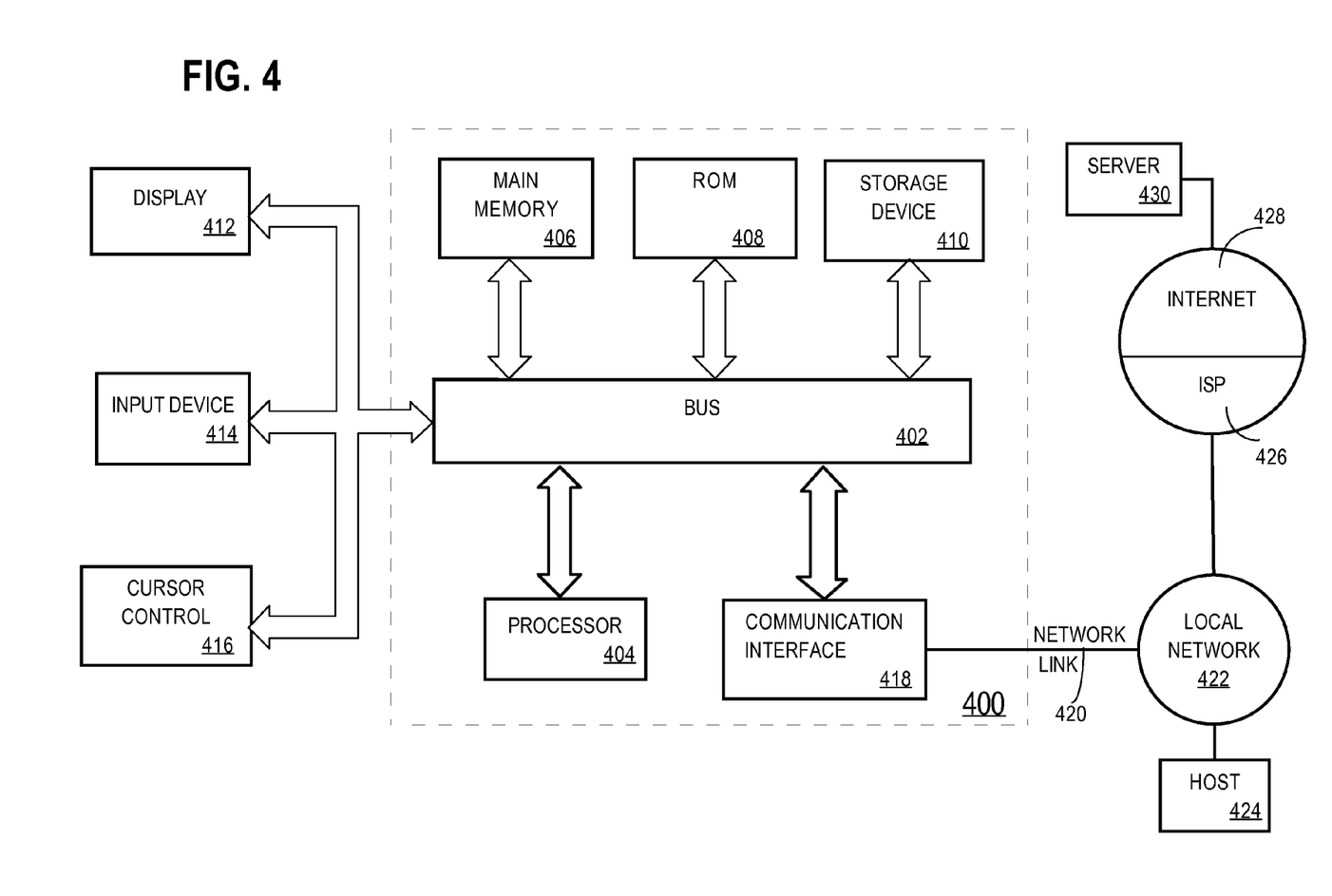
FIG. 4 is a block diagram that illustrates a computer system upon which an embodiment of the approach may be implemented.

For example, FIG. 4 is a block diagram that illustrates a computer system 400 upon which an embodiment of the approach may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

Cloud Computing Overview

The techniques described herein are implemented using one or more processing solutions, examples of which include distributed systems, clustered computing systems, and cloud computing systems. In an embodiment, database management system 100 is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to database management system 100, or to other entities within this description, is controllable via an interface that is exposed at a cloud computing system.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A method comprising:
   determining lost writes that may have occurred among a first set of data blocks of a first database and a second set of data blocks of a second database;
   wherein each data block in said first set of data blocks corresponds to a respective data block in the second set, and
   is associated with a version identifier of a version of the respective data block in said second set;
   wherein each data block in said second set is associated with a version identifier of a version of said each data block in said second set;
   wherein said second set of data blocks is associated with a second checkpoint, for which any version of a data block in the second set that is associated with a particular version identifier below the second checkpoint, has been acknowledged to a database server as having been written to persistent storage of the second database;
   wherein determining lost writes comprises:
   selecting a first data block from the first set of data blocks,
   selecting, from the second set of data blocks, a second data block that corresponds to the first data block, and
   determining that the first data block in the first set and the second data block in the second set satisfy one or more criteria, wherein the one or more criteria include that a version identifier of the first data block is between a version identifier of the second data block and the second checkpoint; and
   wherein the method is performed by one or more computing devices.

2. The method of claim 1, wherein a version identifier is a monotonically increasing system change number indicating a relative order in which a change that created a particular version of a particular data block was made by the database server relative to other changes made by said database server to one or more data blocks.

3. The method of claim 1, wherein the one or more criteria include that a checksum of data in the first data block is not equal to a checksum of data in the second data block.

4. The method of claim 3, wherein the data of the first data block is user data of the first data block and the data of the second data block is user data of the second data block.

5. The method of claim 1, wherein the one or more criteria include whether a version of the first data block, corresponding to the version identifier of the first data block, is created by a change in metadata of the first data block.

6. The method of claim 1, further comprising:
   determining writes are successful among the first set of data blocks and the second set of blocks, wherein determining writes are successful comprises:
   selecting a third data block from the first set of data blocks;
   selecting, from the second set of data blocks, a respective fourth data block that corresponds to the third data block;
   determining that a version identifier of the third data block in the first set is same as a version identifier of the fourth data block in the second set; and
   determining that a checksum of data in the third data block in the first set is equal to a checksum of data in the fourth data block.

7. The method of claim 6, wherein the data of the third data block is user data of the third data block and the data of the fourth data block is user data of the fourth data block.

8. The method of claim 1, wherein the first set of data blocks is replicated from the second set of data blocks.

9. The method of claim 8, wherein a change to the second data block corresponding to a version of the second data block is applied to the first data block to create a corresponding version of the first data block with the version identifier of the second data block.

10. The method of claim 1, wherein the second set of data blocks is from a primary database and the first set of data blocks is from a standby database.

11. One or more non-transitory storage media storing instructions, wherein the instructions include instructions, which, when executed by one or more hardware processors, cause:
    determining lost writes that may have occurred among a first set of data blocks of a first database and a second set of data blocks of a second database;
    wherein each data block in said first set of data blocks corresponds to a respective data block in the second set, and
    is associated with a version identifier of a version of the respective data block in said second set;
    wherein each data block in said second set is associated with a version identifier of a version of said each data block in said second set;
    wherein said second set of data blocks is associated with a second checkpoint, for which any version of a data block in the second set that is associated with a particular version identifier below the second checkpoint, has been acknowledged to a database server as having been written to persistent storage of the second database;
    wherein determining lost writes comprises:
    selecting a first data block from the first set of data blocks,
    selecting, from the second set of data blocks, a second data block that corresponds to the first data block, and
    determining that the first data block in the first set and the second data block in the second set satisfy one or more criteria, wherein the one or more criteria include that a version identifier of the first data block is between a version identifier of the second data block and the second checkpoint.

12. The non-transitory storage media of claim 11, wherein a version identifier is a monotonically increasing system change number indicating a relative order in which a change that created a particular version of a particular data block was made by the database server relative to other changes made by said database server to one or more data blocks.

13. The non-transitory storage media of claim 11, wherein the one or more criteria include that a checksum of data in the first data block is not equal to a checksum of data in the second data block.

14. The non-transitory storage media of claim 13, wherein the data of the first data block is user data of the first data block and the data of the second data block is user data of the second data block.

15. The non-transitory storage media of claim 11, wherein the one or more criteria include whether a version of the first data block, corresponding to the version identifier of the first data block, is created by a change in metadata of the first data block.

16. The non-transitory storage media of claim 11, wherein the instructions further include instructions, which when executed by said one or more hardware processors, cause:
    determining writes are successful among the first set of data blocks and the second set of blocks, wherein determining writes are successful comprises:
    selecting a third data block from the first set of data blocks;
    selecting, from the second set of data blocks, a respective fourth data block that corresponds to the third data block;
    determining that a version identifier of the third data block in the first set is same as a version identifier of the fourth data block in the second set; and
    determining that a checksum of data in the third data block in the first set is equal to a checksum of data in the fourth data block.

17. The non-transitory storage media of claim 16, wherein the data of the third data block is user data of the third data block and the data of the fourth data block is user data of the fourth data block.

18. The non-transitory storage media of claim 11, wherein the first set of data blocks is replicated from the second set of data blocks.

19. The non-transitory storage media of claim 18, wherein a change to the second data block corresponding to a version of the second data block is applied to the first data block to create a corresponding version of the first data block with the version identifier of the second data block.

20. The non-transitory storage media of claim 11, wherein the second set of data blocks is from a primary database and the first set of data blocks is from a standby database.

* * * * *